US012559815B2

(12) United States Patent
Morimoto et al.

(10) Patent No.: US 12,559,815 B2
(45) Date of Patent: Feb. 24, 2026

(54) HIGH-STRENGTH STEEL SHEET AND METHOD FOR PRODUCING SAME

(71) Applicant: JFE Steel Corporation, Tokyo (JP)

(72) Inventors: Ryohei Morimoto, Tokyo (JP); Lingling Yang, Tokyo (JP); Yuki Toji, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 18/727,157

(22) PCT Filed: Dec. 6, 2022

(86) PCT No.: PCT/JP2022/044851
§ 371 (c)(1),
(2) Date: Jul. 8, 2024

(87) PCT Pub. No.: WO2023/135980
PCT Pub. Date: Jul. 20, 2023

(65) Prior Publication Data
US 2025/0075285 A1 Mar. 6, 2025

(30) Foreign Application Priority Data

Jan. 14, 2022 (JP) ................................. 2022-004388

(51) Int. Cl.
C22C 38/00 (2006.01)
B32B 15/01 (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01); *B32B 15/043* (2013.01); *B32B 15/18* (2013.01); *C21D 6/005* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01);
(Continued)

(58) Field of Classification Search
CPC ........ C21D 2211/002; C21D 2211/004; C21D 2211/008; C21D 6/005; C21D 9/46; C21D 8/0205; C21D 8/0226; C21D 8/0236; C21D 8/0263; B32B 15/013; B32B 15/012; B32B 15/04; B32B 15/043; B32B 15/18; B32B 2311/20; C22C 38/001; C22C 38/002; C22C 38/005; C22C 38/008; C22C 38/02; C22C 38/04; C22C 38/06; C22C 38/10; C22C 38/12; C22C 38/14; C22C 38/16; C22C 38/22; C22C 38/28; C22C 38/34; C22C 38/38; C22C 38/54; C22C 38/58; C22C 38/60; C22C 38/08; C22C 38/18; C22C 38/20; C22C 38/24; C22C 38/26; C22C 38/32; C22C 38/40; C22C 38/42; C22C 38/44; C22C 38/46; C22C 38/48; C22C 38/50; C22C 18/00; C23C 2/02; C23C 2/0224; C23C 2/024; C23C 2/06; C23C 2/28; C23C 2/29; C23C 2/40; C23C 28/025; C23C 30/00; C23C 30/005; Y10T 428/12757; Y10T 428/12799; Y10T 428/12951; Y10T 428/12958; Y10T 428/12972
See application file for complete search history.

(56) References Cited

U.S. PATENT DOCUMENTS

2019/0330721 A1 10/2019 Hayashi et al.
2021/0155999 A1* 5/2021 Yokoyama .............. C22C 38/46
(Continued)

FOREIGN PATENT DOCUMENTS

JP 2016050343 A 4/2016
JP 2021123801 A 8/2021
(Continued)

OTHER PUBLICATIONS

International Search Report (PCT/ISA/210) with translation and Written Opinion (PCT/ISA/237) mailed Feb. 28, 2023, by the Japan Patent Office as the International Searching Authority for International Application No. PCT/JP2022/044851. (8 pages).

*Primary Examiner* — Michael E. La Villa
(74) *Attorney, Agent, or Firm* — Buchanan Ingersoll & Rooney PC

(57) ABSTRACT

A high-strength steel sheet having a tensile strength of 1320 MPa or more is disclosed. The above-described high-strength steel sheet includes a specific component composition, wherein a diffusible hydrogen in steel is 0.50 ppm by mass or less, tempered martensite and bainite are 70.0% or more, fresh martensite is 15.0% or less, iron-based carbides existing in the tempered martensite and the bainite have an average equivalent circular radius of 0.10 μm or less and an average aspect ratio of 4.5 or less, and a proportion p of tempered martensite and bainite including iron-based carbides, which have major axes facing the same direction within a range of 0 to 10°, at a number density of 7 to 35/μm² among the tempered martensite and the bainite is 25 to 70%.

12 Claims, No Drawings

(51) Int. Cl.

| | |
|---|---|
| *B32B 15/04* | (2006.01) |
| *B32B 15/18* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C21D 9/46* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C22C 38/60* | (2006.01) |
| *C23C 2/02* | (2006.01) |
| *C23C 2/06* | (2006.01) |
| *C23C 2/28* | (2006.01) |
| *C23C 2/40* | (2006.01) |
| *C23C 28/02* | (2006.01) |
| *C23C 30/00* | (2006.01) |
| *C22C 18/00* | (2006.01) |

(52) U.S. Cl.
CPC .............. *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/0224* (2022.08); *C23C 2/024* (2022.08); *C23C 2/06* (2013.01); *C23C 2/28* (2013.01); *C23C 2/29* (2022.08); *C23C 2/40* (2013.01); *C23C 28/025* (2013.01); *C23C 30/00* (2013.01); *C23C 30/005* (2013.01); *B32B 2311/20* (2013.01); *C21D 2211/002* (2013.01); *C21D 2211/004* (2013.01); *C21D 2211/008* (2013.01); *C22C 18/00* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01)

(56) References Cited

U.S. PATENT DOCUMENTS

| | | | |
|---|---|---|---|
| 2021/0332454 A1 | 10/2021 | Ono et al. | |
| 2022/0251676 A1 | 8/2022 | Minami et al. | |

FOREIGN PATENT DOCUMENTS

| | | | |
|---|---|---|---|
| WO | 2018055695 A1 | 3/2018 | |
| WO | 2020045219 A1 | 3/2020 | |
| WO | 2020179387 A1 | 9/2020 | |
| WO | 2021019947 A1 | 2/2021 | |

* cited by examiner

HIGH-STRENGTH STEEL SHEET AND METHOD FOR PRODUCING SAME

CROSS REFERENCE TO RELATED APPLICATIONS

This is the U.S. National Phase application of PCT/JP2022/044851, filed Dec. 6, 2022, which claims priority to Japanese Patent Application No. 2022-004388, filed Jan. 14, 2022, the disclosures of these applications being incorporated herein by reference in their entireties for all purposes.

FIELD OF THE INVENTION

The present invention relates to a high-strength steel sheet and a method for producing the same.

BACKGROUND OF THE INVENTION

In recent years, from the viewpoint of global environmental conservation, there is an increasing need to reduce the weight of a vehicle body of an automobile in order to improve the fuel efficiency of the automobile.

At this time, the weight of the vehicle body is reduced while maintaining the strength of the vehicle body. For example, conventionally, a high-strength steel sheet having a tensile strength (TS) of 980 MPa or more is used (Patent Literature 1).

PATENT LITERATURES

Patent Literature 1: WO 2020/045219 A

SUMMARY OF THE INVENTION

In recent years, it is desired to use a high-strength steel sheet having a tensile strength (TS) of 1320 MPa or more as a frame component around a cabin of the vehicle body.

Incidentally, as the strength of the steel sheet is increased, the formability of the steel sheet becomes insufficient, and it may be difficult to press the steel sheet into a complicated shape. One of indices of formability is hole expandability evaluated by a hole expansion test.

In a component obtained by, for example, cold pressing a high-strength steel sheet having a tensile strength of 1320 MPa or more, delayed fracture may occur.

The delayed fracture is a phenomenon in which, when a component to which stress is applied is placed in a hydrogen intrusion environment, hydrogen intrudes into the component to reduce an interatomic bonding force or to cause local deformation, so that a microcrack is generated, and the component is broken as the microcrack develops.

Therefore, the high-strength steel sheet is required to have not only sufficient hole expandability but also favorable delayed fracture resistance characteristics.

Aspects of the present invention have been made in view of the above points, and an object thereof is to provide a high-strength steel sheet having a tensile strength of 1320 MPa or more and excellent in hole expandability and delayed fracture resistance characteristics.

The present inventors have conducted intensive studies, and as a result, have found that the above object is achieved by adopting the following configuration, thereby completing aspects of the present invention.

That is, aspects of the present invention include the following [1] to [7].

[1] A high-strength steel sheet comprising:
a component composition including, by mass %:
C: 0.130 to 0.350%,
Si: 0.50 to 2.50%,
Mn: 2.00 to 4.00%,
P: 0.100% or less,
S: 0.0500% or less,
Al: 0.001 to 2.000%,
N: 0.0100% or less, and
a balance consisting of Fe and inevitable impurities; and
a microstructure, wherein
a diffusible hydrogen in steel is 0.50 ppm by mass or less,
a total area fraction of tempered martensite and bainite in the microstructure is 70.0% or more,
an area fraction of fresh martensite is 15.0% or less,
iron-based carbides existing in the tempered martensite and the bainite have an average equivalent circular radius of 0.10 $\mu$m or less and an average aspect ratio of 4.5 or less, and
a proportion p of tempered martensite and bainite including iron-based carbides, which have major axes facing the same direction within a range of 0 to 10°, at a number density of 7 to 35/$\mu$m$^2$ among the tempered martensite and the bainite is 25 to 70%.

[2] The high-strength steel sheet according to [1], wherein the component composition further includes, by mass %, at least one element selected from the group consisting of:
Ti: 0.100% or less,
Nb: 0.100% or less,
V: 0.500% or less,
W: 0.500% or less,
B: 0.0100% or less,
Ni: 2.000% or less,
Co: 2.000% or less,
Cr: 1.000% or less,
Mo: 1.000% or less,
Cu: 1.000% or less,
Sn: 0.500% or less,
Sb: 0.500% or less,
Ta: 0.100% or less,
Zr: 0.200% or less,
Hf: 0.020% or less,
Ca: 0.0100% or less,
Mg: 0.0100% or less, and
REM: 0.0100% or less.

[3] The high-strength steel sheet according to [1] or [2], comprising a plating layer on a surface.

[4] The high-strength steel sheet according to [3], wherein the plating layer is an alloyed plating layer.

[5] A method for producing the high-strength steel sheet according to [1] or [2], the method comprising:
heating a steel slab having the component composition according to [1] or [2] to 1100° C. or higher and hot rolling the steel slab at a finish rolling finishing temperature of 850 to 950° C. to obtain a hot-rolled steel sheet;
coiling the hot-rolled steel sheet at a coiling temperature of 700° C. or lower and then cold rolling the coiled hot-rolled steel sheet to obtain a cold-rolled steel sheet; and
subjecting the cold-rolled steel sheet to a heat treatment, wherein
in the heat treatment, the cold-rolled steel sheet is held in a temperature region T1 of 800 to 950° C. for 30 seconds or more, then cooled to a cooling stop temperature T2 of 250° C. or lower, then heated at a temperature rising rate of 6.0 to 14.0° C./s to a temperature region T3 of 250 to 400° C., and then held for 30 seconds or more, and in the cooling, the cold-rolled steel sheet is primarily cooled to a temperature T at an average cooling rate $R_1$ of 10.0 to 50.0° C./s and then secondarily cooled to the cooling stop temperature T2 at an average cooling rate $R_2$ under a condition that the following Formulas 1 and 2 are satisfied.

$$0.10 < (R_2/R_1) < 0.70 \qquad \text{Formula 1}$$

$$(21.52 \times T + 5630) \times R_2^{-0.022} \geq 12200 \qquad \text{Formula 2}$$

[6] The method for producing the high-strength steel sheet according to [5], wherein the cold-rolled steel sheet is subjected to a plating treatment for forming a plating layer after the heat treatment.

[7] The method for producing the high-strength steel sheet according to [6], wherein the plating treatment includes an alloying plating treatment for alloying the plating layer.

According to aspects of the present invention, it is possible to provide a high-strength steel sheet having a tensile strength of 1320 MPa or more and excellent in hole expandability and delayed fracture resistance characteristics.

DETAILED DESCRIPTION OF EMBODIMENTS OF THE INVENTION

[High-Strength Steel Sheet]

A high-strength steel sheet according to aspects of the present invention has a component composition and a microstructure described below, and satisfies a diffusible hydrogen amount in steel described below.

Hereinafter, the "high-strength steel sheet" is also simply referred to as "steel sheet".

The sheet thickness of the steel sheet is not particularly limited, and is, for example, 0.3 to 3.0 mm and preferably 0.5 to 2.8 mm.

The high strength means that a tensile strength (TS) is 1320 MPa or more.

The high-strength steel sheet according to aspects of the present invention has a tensile strength of 1320 MPa or more, and is also excellent in hole expandability and delayed fracture resistance characteristics. Therefore, the high-strength steel sheet according to aspects of the present invention has a very high utility value in industrial fields such as automobiles and electric equipment, and is particularly extremely useful for weight reduction of a frame component of a vehicle body of an automobile.

<Component Composition>

The component composition of the high-strength steel sheet according to aspects of the present invention (hereinafter, also referred to as "component composition according to aspects of the present invention" for convenience) will be described.

"%" in the component composition according to aspects of the present invention means "mass %" unless otherwise specified.

<<C: 0.130% to 0.350%>>

C increases the strength of tempered martensite, bainite, and fresh martensite.

C precipitates a fine carbide that becomes a trap site of hydrogen inside tempered martensite and bainite, and improves delayed fracture resistance characteristics.

In order to sufficiently obtain these effects, the amount of C is 0.130% or more, preferably 0.150% or more, and more preferably 0.170% or more.

On the other hand, when the amount of C is too large, the strength of the steel sheet becomes excessively high, so that the hydrogen embrittlement susceptibility of the steel is increased, and sufficient delayed fracture resistance characteristics cannot be obtained. Weldability, which is important in joining automobile components, is deteriorated.

Therefore, the amount of C is 0.350% or less, preferably 0.330% or less, and more preferably 0.310% or less.

<<Si: 0.50% to 2.50%>>

Si suppresses excessive formation and growth of carbides. For this reason, when reheating is performed in a heat treatment described later, carbides (iron-based carbides) to be formed tend to face the same direction, and the delayed fracture resistance characteristics are improved. A decrease in hole expandability due to a difference in hardness between the carbide and each structure is suppressed.

From the viewpoint of obtaining such effects, the amount of Si is 0.50% or more, preferably 0.55% or more, and more preferably 0.60% or more.

On the other hand, when the amount of Si is too large, the steel sheet becomes brittle, and it is difficult to obtain favorable hole expandability.

Therefore, the amount of Si is 2.50% or less, preferably 2.30% or less, and more preferably 2.00% or less.

<<Mn: 2.00% to 4.00%>>

Mn forms a microstructure mainly including tempered martensite and bainite, thereby suppressing a difference in hardness between respective structures and improving the hole expandability. When the amount of Mn is too small, a soft phase such as ferrite is generated, a non-negligible difference in hardness occurs between respective structures, and sufficient hole expandability cannot be obtained.

Therefore, the amount of Mn is 2.00% or more, preferably 2.20% or more, and more preferably 2.50% or more.

On the other hand, when the amount of Mn is too large, the steel sheet becomes brittle, and it is difficult to obtain favorable hole expandability.

Therefore, the amount of Mn is 4.00% or less, preferably 3.70% or less, and more preferably 3.50% or less.

<<P: 0.100% or Less>>

P embrittles the steel sheet due to grain boundary segregation, and adversely affects delayed fracture resistance characteristics and weldability. Therefore, the amount of P is 0.100% or less, preferably 0.080% or less, more preferably 0.070% or less, still more preferably 0.030% or less, and particularly preferably 0.010% or less.

<<S: 0.0500% or Less>>

S segregates at grain boundaries and embrittles the steel sheet during hot working. S forms a sulfide, thereby adversely affecting delayed fracture resistance characteristics. Therefore, the amount of S is 0.0500% or less, preferably 0.0400% or less, more preferably 0.0300% or less, still more preferably 0.0100% or less, and particularly preferably 0.0050% or less.

<<Al: 0.001 to 2.000%>>

Al acts as a deoxidizer to reduce an inclusion in the steel sheet. Therefore, the amount of Al is 0.001% or more, preferably 0.005% or more, more preferably 0.010% or more, and still more preferably 0.015% or more.

On the other hand, when the amount of Al is too large, the risk of cracking in the steel slab during casting the steel slab increases, and manufacturability is deteriorated. Therefore, the amount of Al is 2.000% or less, preferably 1.500% or less, more preferably 1.000% or less, still more preferably 0.500% or less, and particularly preferably 0.100% or less.

<<N: 0.0100% or Less>>

N adversely affects delayed fracture resistance characteristics due to formation of a nitride. When the amount of N is too large, a coarse nitride is formed, and deterioration of delayed fracture resistance characteristics becomes remarkable. Therefore, the amount of N is preferably smaller. Specifically, the amount of N is 0.0100% or less, preferably 0.0080% or less, and more preferably 0.0070% or less.

<<Other Elements>>

The component composition according to aspects of the present invention may further include, by mass %, at least one element selected from the group consisting of elements described below.

(Ti: 0.100% or Less, Nb: 0.100% or Less, V: 0.500% or Less)

Ti, Nb, and V contribute to precipitation strengthening, and are thus effective in increasing the strength of the steel sheet. Ti, Nb, and V make the delayed fracture resistance characteristics better by making the grain size of prior austenite grains finer, accordingly making tempered martensite and bainite finer, or forming a fine precipitate that becomes a trap site of hydrogen.

On the other hand, when the amounts of Ti, Nb, and V are too large, Ti, Nb, and V remain in an undissolved state when the steel slab is heated in hot rolling, and a coarse precipitate increases, so that the delayed fracture characteristics may be deteriorated.

Therefore, the amount of Ti and the amount of Nb are each preferably 0.100% or less, more preferably 0.080% or less, and still more preferably 0.050% or less. The amount of V is preferably 0.500% or less, more preferably 0.450% or less, and still more preferably 0.400% or less.

The lower limit is not particularly limited, but from the viewpoint of obtaining the addition effect of these elements, the amount of Ti, the amount of Nb, and the amount of V are each preferably 0.001% or more, more preferably 0.003% or more, and still more preferably 0.005% or more.

(W: 0.500% or Less)

W improves the hardenability of the steel sheet. W makes the delayed fracture resistance characteristics better by generating a fine carbide containing W and becoming a trap site of hydrogen, or making tempered martensite and bainite finer.

However, when the amount of W is too large, coarse precipitates such as WN and WS remaining in an undissolved state increase when the steel slab is heated in hot rolling, and the delayed fracture resistance characteristics are deteriorated. Therefore, the amount of W is preferably 0.500% or less, more preferably 0.300% or less, and still more preferably 0.150% or less.

The lower limit of the amount of W is not particularly limited, but is, for example, 0.010% and preferably 0.050% from the viewpoint of obtaining the addition effect of W.

(B: 0.0100% or Less)

B is effective for improving hardenability. B forms a microstructure mainly including tempered martensite and bainite and prevents deterioration of hole expandability.

However, when the amount of B is too large, formability may be deteriorated. Therefore, the amount of B is preferably 0.0100% or less, more preferably 0.0070% or less, and still more preferably 0.0050% or less.

The lower limit of the amount of B is not particularly limited, but is, for example, 0.0005% and preferably 0.0010% from the viewpoint of obtaining the addition effect of B.

(Ni: 2.000% or Less)

Ni increases the strength of the steel by solid-solution strengthening.

However, when the amount of Ni is too large, the area fraction of fresh martensite becomes excessive, and the hole expandability is deteriorated. Therefore, the amount of Ni is preferably 2.000% or less, more preferably 1.000% or less, and still more preferably 0.500% or less.

The lower limit of the amount of Ni is not particularly limited, but is, for example, 0.010% and preferably 0.050% from the viewpoint of obtaining the addition effect of Ni.

(Co: 2.000% or Less)

Co is an element effective for improving hardenability, and is effective for strengthening the steel sheet.

However, when the amount of Co is too large, deterioration of formability occurs. Therefore, the amount of Co is preferably 2.000% or less, more preferably 1.000% or less, and still more preferably 0.500% or less.

The lower limit of the amount of Co is not particularly limited, but is, for example, 0.010% and preferably 0.050% from the viewpoint of obtaining the addition effect of Co.

(Cr: 1.000% or Less)

Cr improves the balance between strength and ductility.

However, when the amount of Cr is too large, the cementite solid solution rate is delayed during reheating in a heat treatment described below, and a relatively coarse carbide containing Fe such as cementite as a main component remains in an undissolved state, and the delayed fracture resistance characteristics are deteriorated. Therefore, the amount of Cr is preferably 1.000% or less, more preferably 0.800% or less, and still more preferably 0.500% or less.

The lower limit of the amount of Cr is not particularly limited, but is, for example, 0.030% and preferably 0.050% from the viewpoint of obtaining the addition effect of Cr.

(Mo: 1.000% or Less)

Mo improves the balance between strength and ductility. Mo makes the delayed fracture resistance characteristics better by generating a fine carbide containing Mo and becoming a trap site of hydrogen, or making tempered martensite and bainite finer.

However, when the amount of Mo is too large, conversion treatability is significantly deteriorated. Therefore, the amount of Mo is preferably 1.000% or less, more preferably 0.800% or less, and still more preferably 0.500% or less.

The lower limit of the amount of Mo is not particularly limited, but is, for example, 0.010% and preferably 0.050% from the viewpoint of obtaining the addition effect of Mo.

(Cu: 1.000% or Less)

Cu is an element effective for strengthening steel. Cu suppresses intrusion of hydrogen into the steel sheet, so that Cu is more excellent in delayed fracture resistance characteristics.

However, when the amount of Cu is too large, the area fraction of fresh martensite becomes excessive, and the hole expandability is deteriorated. Therefore, the amount of Cu is preferably 1.000% or less, more preferably 0.500% or less, and still more preferably 0.200% or less.

The lower limit of the amount of Cu is not particularly limited, but is, for example, 0.010% and preferably 0.050% from the viewpoint of obtaining the addition effect of Cu.

(Sn: 0.500% or less, Sb: 0.500% or Less)

Sn and Sb suppress decarburization of a surface layer region of the steel sheet (a region having a depth of about several tens μm from the surface of the steel sheet) caused by nitriding or oxidation of the surface of the steel sheet, and prevent a decrease in the area fraction of tempered martensite on the surface of the steel sheet.

However, when the amounts of these elements are too large, toughness is reduced. Therefore, the amount of Sn and the amount of Sb are each preferably 0.500% or less, more preferably 0.100% or less, and still more preferably 0.050% or less.

The lower limits of the amount of Sn and the amount of Sb are not particularly limited, but are each, for example, 0.001% and preferably 0.003% from the viewpoint of obtaining the addition effect of Sn and Sb.

(Ta: 0.100% or Less)

Ta generates an alloy carbide or an alloy carbonitride and contributes to high strength. Ta is partially dissolved in Nb carbide or Nb carbonitride to form a composite precipitate such as (Nb, Ta) (C, N), thereby significantly suppressing coarsening of the precipitate and stabilizing contribution to strength due to precipitation strengthening.

However, even when Ta is excessively added, these effects are saturated, and the cost also increases. Therefore, the amount of Ta is preferably 0.100% or less, more preferably 0.080% or less, and still more preferably 0.070% or less.

The lower limit of the amount of Ta is not particularly limited, but is, for example, 0.005% and preferably 0.010% from the viewpoint of obtaining the addition effect of Ta.

(Zr: 0.200% or Less)

Zr improves the hardenability of the steel sheet. Zr makes the delayed fracture resistance characteristics better by generating a fine carbide containing Zr and becoming a trap site of hydrogen, or making tempered martensite and bainite finer.

However, when the amount of Zr is too large, an increase in inclusions and the like is caused, defects on the surface and the inside of the steel sheet are caused, and the delayed fracture resistance characteristics are deteriorated. Therefore, the amount of Zr is preferably 0.200% or less, more preferably 0.150% or less, and still more preferably 0.100% or less.

The lower limit of the amount of Zr is not particularly limited, but is, for example, 0.005% and preferably 0.010% from the viewpoint of obtaining the addition effect of Zr.

(Hf: 0.020% or Less)

Hf affects the distribution state of an oxide and makes the delayed fracture resistance characteristics better.

However, when the amount of Hf is too large, the formability of the steel sheet is deteriorated. Therefore, the amount of Hf is preferably 0.020% or less, more preferably 0.015% or less, and still more preferably 0.010% or less.

The lower limit of the amount of Hf is not particularly limited, but is, for example, 0.001% and preferably 0.003% from the viewpoint of obtaining the addition effect of Hf.

(Ca: 0.0100% or Less, Mg: 0.0100% or Less, REM: 0.0100% or Less)

Ca, Mg, and REM (rare earth metal) spheroidize the shape of sulfides and improve the negative impact of sulfides on hole expandability.

However, when the amounts of these elements are too large, an increase in inclusions and the like is caused, defects and the like on the surface and the inside of the steel sheet are caused, and the delayed fracture resistance characteristics are deteriorated. Therefore, the amount of Ca, the amount of Mg, and the amount of REM are each preferably 0.0090% or less, more preferably 0.0080% or less, and still more preferably 0.0070% or less.

The lower limits of the amount of Ca, the amount of Mg, and the amount of REM are not particularly limited, but are each, for example, 0.0005% and preferably 0.0010% from the viewpoint of obtaining the addition effect of Ca, Mg, and REM.

<<Balance: Fe and Inevitable Impurities>>

The balance in the component composition according to aspects of the present invention consists of Fe and inevitable impurities.

<Microstructure>

Next, the microstructure of the high-strength steel sheet according to aspects of the present invention (hereinafter, also referred to as "microstructure according to aspects of the present invention" for convenience) will be described.

In order to obtain the effect according to aspects of the present invention, it is insufficient to satisfy only the component composition according to aspects of the present invention described above, and it is necessary to satisfy the microstructure according to aspects of the present invention described below.

Hereinafter, the area fraction is an area fraction with respect to the entire microstructure. The area fraction of each structure is determined by the method described in EXAMPLES described below.

<<Total Area Fraction of Tempered Martensite and Bainite: 70.0% or More>>

Tempered martensite and bainite contribute to tensile strength.

By mainly including tempered martensite and bainite, it is effective for enhancing hole expandability while maintaining high strength.

In order to sufficiently obtain these effects, the total area fraction of bainite and tempered martensite is 70.0% or more, preferably 72.0% or more, and more preferably 74.0% or more.

On the other hand, the upper limit is not particularly limited, but in view of production conditions, the total area fraction of tempered martensite and bainite is preferably 95.0% or less, more preferably 93.0% or less, and still more preferably 90.0% or less.

<<Area Fraction of Fresh Martensite: 15.0% or Less>>

Fresh martensite causes a large difference in hardness between tempered martensite and bainite, thus reducing the hole expandability during punching due to the difference in hardness. Therefore, it is necessary to avoid excessive presence of fresh martensite in the steel sheet.

Specifically, from the viewpoint of obtaining favorable hole expandability, the area fraction of fresh martensite is 15.0% or less, preferably 14.0% or less, and more preferably 13.0% or less.

<<Balance Structure>>

Examples of the structure (balance structure) excluding tempered martensite, bainite, and fresh martensite include retained austenite, ferrite, and pearlite. For the reason that the effect according to aspects of the present invention is not inhibited, the area fraction of the balance structure in the microstructure according to aspects of the present invention is preferably 15.0% or less.

<<Iron-Based Carbide>>

Next, an iron-based carbide will be described.

Iron-based carbides exist in tempered martensite and bainite.

The iron-based carbide is a carbide mainly composed of Fe and C, such as cementite ($\theta$ carbide), $\varepsilon$ carbide, or $\chi$ carbide, and mainly refers to cementite.

A part of Fe contained in the iron-based carbide may be substituted with other elements such as Mn, Si, and Cr.

(Average Equivalent Circular Radius: 0.10 μm or Less)

When an average equivalent circular radius of the iron-based carbides is too large, since the iron-based carbide is excessively coarse, voids starting from the iron-based carbides are likely to be generated during press working, and hole expandability is deteriorated.

Therefore, the average equivalent circular radius of the iron-based carbides is 0.10 μm or less, preferably 0.08 μm or less, and more preferably 0.06 μm or less.

(Average Aspect Ratio: 4.5 or Less)

As an average aspect ratio of the iron-based carbides is too large, stress concentrates during press working, and voids due to cracking of the iron-based carbides are likely to occur particularly at a sheared end face, and favorable hole expandability cannot be obtained.

Therefore, the average aspect ratio of the iron-based carbides is 4.5 or less, preferably 4.3 or less, and more preferably 4.5 or less.

The average equivalent circular radius and the average aspect ratio of the iron-based carbides are determined by the methods described in EXAMPLES described below.

<<Proportion p: 25 to 70%>>

Next, a proportion p of tempered martensite and bainite including iron-based carbides, which have major axes facing the same direction within a range of 0 to 10°, at a number density of 7 to 35/μm² among the tempered martensite and the bainite (for convenience, also simply referred to as "proportion p") will be described.

As described above, iron-based carbides exist in tempered martensite and bainite.

First, regardless of the presence or absence of the iron-based carbides, the total area occupied by the grains of tempered martensite and bainite in the microstructure is provisionally referred to as an area SA1.

Next, among the grains (tempered martensite and bainite) in which the iron-based carbides exist, attention is paid to grains moderately including the iron-based carbides whose directions are aligned. More specifically, attention is paid to grains including iron-based carbides, which have major axes facing the same direction within a range of 0 to 10°, at a number density of 7 to 35/μm², and the area occupied by the grains is provisionally referred to as an area SA2.

The proportion p (unit: %) is a proportion (=100×SA2/SA1) of the area SA2 with respect to the area SA1.

When the proportion p is a certain value or more, the delayed fracture resistance characteristics can be improved without impairing hole expandability.

Typically, coarse iron-based carbides existing at lath boundaries and/or block boundaries are sources of voids during deformation. However, since the iron-based carbides whose directions are aligned are fine and not extremely elongated, an adverse effect on the hole expandability is small.

In the structure in which directions of iron-based carbides are aligned, the number of iron-based carbides tends to be larger than that in structures in which directions of iron-based carbides are not aligned, and by including such a structure in the steel sheet, the number of trap sites of hydrogen can be increased, and the delayed fracture resistance characteristics can be improved.

Therefore, the value of the proportion p is 25% or more, preferably 26% or more, more preferably 29% or more, still more preferably 30% or more, particularly preferably 35% or more, and most preferably 39% or more.

On the other hand, when the steel sheet excessively includes a structure in which the directions of iron-based carbides are aligned, there is an increased possibility that voids having cementite as a starting point are formed during processing of the steel sheet, which adversely affects the hole expandability.

Therefore, from the viewpoint of obtaining favorable hole expandability, the value of the proportion p is 70% or less, preferably 65% or less, and more preferably 60% or less.

The proportion p is determined by the method described in EXAMPLES described below.

<Diffusible Hydrogen Amount in Steel: 0.50 ppm by Mass or Less>

From the viewpoint of securing favorable delayed fracture resistance characteristics, the diffusible hydrogen amount in steel is 0.50 ppm by mass or less, preferably 0.40 ppm by mass or less, and more preferably 0.30 ppm by mass or less.

The lower limit of the diffusible hydrogen amount in steel is not particularly limited, but is, for example, 0.01 ppm by mass due to restrictions on production technology.

The diffusible hydrogen amount in steel is determined by the method described in EXAMPLES described below.

<Plating Layer>

The high-strength steel sheet according to aspects of the present invention may include a plating layer on a surface thereof. The plating layer is formed by a plating treatment described below.

Examples of the plating layer include a zinc plating layer (Zn plating layer) and an Al plating layer, and among them, a zinc plating layer is preferable. The zinc plating layer may contain elements such as Al and Mg. The plating layer may be a plating layer subjected to alloying (alloyed plating layer).

A coating weight (coating weight per one surface) of the plating layer is preferably 20 g/m² or more, more preferably 25 g/m² or more, and still more preferably 30 g/m² or more, from the viewpoint of controlling the coating weight of the plating layer and the viewpoint of corrosion resistance.

On the other hand, from the viewpoint of adhesion, the coating weight of the plating layer is preferably 120 g/m² or less, more preferably 100 g/m² or less, and still more preferably 70 g/m² or less.

[Method for Producing High-Strength Steel Sheet]

Next, the method for producing the high-strength steel sheet according to aspects of the present invention (hereinafter, also referred to as "production method according to aspects of the present invention" for convenience) will be described.

<Steel Slab>

In the production method according to aspects of the present invention, first, a steel slab (steel material) having the above-described component composition according to aspects of the present invention is prepared.

The steel slab is cast from molten steel, for example, by a known method such as a continuous casting method.

The method for producing molten steel is not particularly limited, and a known method using a converter furnace, an electric furnace, or the like can be adopted.

<Hot Rolling>

In the production method according to aspects of the present invention, the prepared steel slab is subjected to hot rolling under the conditions (heating temperature and finish rolling finishing temperature) described below to obtain a hot-rolled steel sheet.

<<Heating Temperature: 1100° C. or Higher>>

In hot rolling, the steel slab is heated.

The precipitates present in the stage of heating the steel slab are present as coarse precipitates in the finally obtained steel sheet, and not only do they not contribute to the strength, but they adversely affect the delayed fracture resistance characteristics.

Since the presence of coarse precipitates suppresses the formation of iron-based carbides, the proportion p becomes too small after the heat treatment described below, and the delayed fracture resistance characteristics are deteriorated.

Therefore, coarse precipitates precipitated during casting of the steel slab need to be redissolved as much as possible. When the heating temperature of the steel slab is too low, redissolution becomes insufficient and the strength or delayed fracture resistance characteristics are deteriorated.

Therefore, the heating temperature of the steel slab is 1100° C. or higher, and preferably 1150° C. or higher.

From the viewpoint of reducing the rolling force and the viewpoint of scaling off surface layer defects (bubbles, segregation, and the like) of the steel slab to smooth the surface of the steel sheet to be obtained, the heating temperature of the steel slab is preferably within the above range.

The upper limit of the heating temperature of the steel slab is not particularly limited, but when the heating temperature is too high, scale loss increases as the oxidation amount increases. Therefore, the heating temperature of the steel slab is preferably 1400° C. or lower and more preferably 1350° C. or lower.

<<Finish Rolling Finishing Temperature: 850 to 950° C.>>

The steel slab heated to the heating temperature described above is subjected to hot rolling including finish rolling to form a hot-rolled steel sheet.

When the finish rolling finishing temperature is too low, ferrite or pearlite is excessively generated in the microstructure of the hot-rolled steel sheet, and the total area fraction of tempered martensite and bainite in the microstructure after the heat treatment described below becomes too small, and the strength (tensile strength) decreases. The rolling force increases and the rolling load increases.

Therefore, the finish rolling finishing temperature is 850° C. or higher, preferably 855° C. or higher, and more preferably 860° C. or higher.

On the other hand, when the finish rolling finishing temperature is too high, excessive growth of precipitates present at the stage of heating the steel slab and the production of new coarse precipitates are promoted. Since the presence of coarse precipitates suppresses the formation of iron-based carbides, the proportion p becomes too small after the heat treatment described below, and the delayed fracture resistance characteristics are deteriorated.

The amount of oxide (scale) produced rapidly increases, and the surface quality tends to deteriorate after pickling and cold rolling described below.

When scale cannot be sufficiently removed by pickling, the hole expandability is adversely affected.

The crystal grain size becomes excessively coarse, and surface roughness may occur during press working.

Therefore, the finish rolling finishing temperature is 950° C. or lower, preferably 940° C. or lower, and more preferably 930° C. or lower.

<Coiling>

The hot-rolled steel sheet obtained by hot rolling is coiled under a coiling temperature described below.

<<Coiling Temperature: 700° C. or Lower>>

When the coiling temperature is too high, ferrite or pearlite is excessively generated in the microstructure of the hot-rolled steel sheet, and the total area fraction of tempered martensite and bainite in the microstructure after the heat treatment described below becomes too small, which may cause a decrease in strength (tensile strength). An oxide film that is difficult to remove by pickling is generated on the surface of the hot-rolled steel sheet, which may impair the surface appearance after cold rolling and cause deterioration of the hole expandability.

Therefore, the coiling temperature T is 700° C. or lower, preferably 680° C. or lower, and more preferably 670° C. or lower.

On the other hand, the coiling temperature may be low, but is preferably 400° C. or higher, more preferably 420° C. or higher, and still more preferably 430° C. or higher from the viewpoint of productivity. When the coiling temperature is in this range, the rolling load in the cold rolling is easily reduced, and the shape of the cold-rolled steel sheet obtained by the cold rolling is easily improved.

The coiled hot-rolled steel sheet (coil) may be subjected to pickling as necessary before cold rolling described below. The pickling method may be performed according to a conventional method. In order to correct the shape and improve pickling properties, skin pass rolling may be performed.

<Cold Rolling>

The coiled hot-rolled steel sheet is subjected to pickling as necessary, and then subjected to cold rolling to obtain a cold-rolled steel sheet.

A reduction ratio in the cold rolling is preferably 25% or more and more preferably 30% or more.

On the other hand, excessive reduction makes the rolling load excessive and causes an increase in the load of a mill used for cold rolling. Therefore, the reduction ratio is preferably 75% or less and more preferably 70% or less.

<Heat Treatment>

The cold-rolled steel sheet obtained by cold rolling is subjected to the heat treatment under the conditions described below.

Schematically, the cold-rolled steel sheet is held (heated) in a temperature region T1, then cooled to a cooling stop temperature T2, and then held (reheated) in the temperature region T2.

<<Temperature Region T1: 800 to 950° C.>>

When the temperature in the temperature region T1 is too low, the cold-rolled steel sheet is held in a two-phase region, and thus the total area fraction of tempered martensite and bainite in the finally obtained microstructure becomes too small.

Therefore, the temperature in the temperature region T1 is 800° C. or higher, preferably 820° C. or higher, and more preferably 840° C. or higher.

On the other hand, when the temperature in the temperature region T1 is too high, the grain size of prior austenite grains increases, the directions of the iron-based carbides precipitated in the subsequent holding in a temperature region T3 are not aligned, and the proportion p becomes too small, so that the delayed fracture characteristics are deteriorated.

Therefore, the temperature is 950° C. or lower, preferably 940° C. or lower, and more preferably 920° C. or lower.

<<Retention Time in Temperature Region T1: 30 Seconds or More>>

When the retention time in the temperature region T1 is too short, sufficient recrystallization is not performed. The formation of austenite is insufficient, and the total area fraction of tempered martensite and bainite in the finally obtained microstructure becomes too small.

Therefore, the retention time in the temperature region T1 is 30 seconds or more, preferably 65 seconds or more, and more preferably 100 seconds or more.

The upper limit of the retention time in the temperature region T1 is not particularly limited, but is, for example, 800 seconds, preferably 500 seconds, and more preferably 200 seconds.

<<Cooling Stop Temperature T2: 250° C. or Lower>>

When the cooling stop temperature T2 is too high, a large amount of austenite remains when cooling is stopped, and the area fraction of fresh martensite becomes too large in the finally obtained microstructure.

Therefore, the cooling stop temperature T2 is 250° C. or lower, preferably 240° C. or lower, and more preferably 230° C. or lower.

The lower limit of the cooling stop temperature T2 is not particularly limited, but is, for example, 100° C. and preferably 120° C.

<<Cooling>>

In the cooling from the temperature region T1 to the cooling stop temperature T2, primary cooling is performed to a temperature T at an average cooling rate $R_1$ of 10.0 to 50.0° C./s and then secondary cooling is performed to the cooling stop temperature T2 at an average cooling rate $R_2$ under a condition that the following Formulas 1 and 2 are satisfied.

$$0.10 < \left(R_2/R_1\right) < 0.70 \qquad \text{Formula 1}$$

$$(21.52 \times T + 5630) \times R_2^{-0.022} \geq 12200 \qquad \text{Formula 2}$$

The average cooling rate $R_2$ of the secondary cooling is determined by the average cooling rate $R_1$ of the primary cooling and the finishing temperature (temperature T) of the primary cooling.

(Formula 1)

As shown in the above Formula 1, the average cooling rate $R_2$ of the secondary cooling is made slower than the average cooling rate $R_1$ of the primary cooling. This is because nucleation of the iron-based carbide is promoted during secondary cooling, and fine iron-based carbides widely exist in the finally obtained microstructure.

That is, when ($R_2/R_1$) in the above Formula 1 is less than 0.70, it is suppressed that the value of the proportion p becomes too small.

(Formula 2)

By satisfying the above Formula 2, appropriate nucleation of the iron-based carbide is promoted, so that formation of the iron-based carbide having an excessive average aspect ratio is suppressed in holding (reheating) in the temperature region T3 described below.

By satisfying the above Formula 2, nucleation of the iron-based carbide occurs in the secondary cooling, and it is suppressed that the proportion p becomes too small in the finally obtained microstructure.

Therefore, the value on the left side of the above Formula 2 is 12200 or more, more preferably 12250 or more, and still more preferably 12290 or more.

The upper limit is not particularly limited, but the value on the left side of the above Formula 2 is preferably 14500 or less, more preferably 14250 or less, and still more preferably 14200 or less.

The above Formula 2 is derived from the calculation result of a tempering parameter when temperature fluctuation occurs.

According to Non-Patent Literature 1, in the case of calculating a tempering parameter when temperature fluctuation occurs, it is necessary to convert the entire process of the heat treatment into tempering that is equivalent thereto and is held for a certain period of time at a certain constant temperature.

Non-Patent Literature 1: TSUCHIYAMA Toshihiro, "Physical Meaning of Tempering Parameter and Its Application to Continuous Heating or Cooling Heat Treatment Process", Heat Treatment, The Japan Society for Heat Treatment, June 2002, Vol. 42, No. 3, p. 163-168

The time from the start temperature to the cooling stop temperature of the secondary cooling is divided by, for example, Δt, and the initial temperatures in respective sections determined from the average cooling rate are denoted by $T_1$, $T_2$, $T_3$, .... $T_n$. Assuming that $T_1 \times (\log(\Delta t)+20)$ is a tempering parameter when Δt has elapsed from the start of cooling, a conversion time Δt' for performing tempering equivalent to this value at the temperature $T_2$ in the next section is expressed as:

$T_1 \times (\log(\Delta t)+20) = T_2 \times (\log(\Delta t')+20)$, and the tempering parameter from the first section to the end of the second section is determined as follows:

$$T_2 \times (\log(\Delta t' + \Delta t) + 20).$$

When $t_2 = \Delta t' + \Delta t$, this operation is performed up to the n-th section, and tempering by the secondary cooling is converted into tempering in which tempering is held at a cooling stop temperature, an equivalent constant temperature retention time $t_n$ is calculated as:

$$\log(t_n) = \left(T_{n-1}/T_n\right) \times ((\log t_{n-1} + 20) - 20).$$

By using the equivalent constant temperature retention time $t_n$ and a stop temperature $T_{sq}$ of the secondary cooling, the tempering parameter at the time of continuous cooling can be calculated by using the following formula.

$$T_{sq} \times (\log(t_n) + 20)$$

An approximate formula is determined from values obtained by substituting various cooling stop temperatures $T_{sq}$ and the equivalent constant temperature retention time $t_n$ into this formula, and the above Formula 2 is obtained in consideration of the minimum value of the tempering parameter for obtaining the intended microstructure.

<<Temperature Region T3: 250 to 400° C.>>

When the temperature in the temperature region T3 is too low, the growth of the iron-based carbide due to tempering does not occur, the proportion p becomes too small, and the delayed fracture resistance characteristics are deteriorated.

Therefore, the temperature in the temperature region T3 is 250° C. or higher, preferably 260° C. or higher, and more preferably 270° C. or higher.

On the other hand, when the temperature in the temperature region T3 is too high, the iron-based carbides in tempered martensite and bainite become coarse, the average equivalent circular radius of the iron-based carbides becomes too large, and initial cracks are likely to occur at the sheared end face, so that the hole expandability of the steel sheet is deteriorated.

Therefore, the temperature in the temperature region T3 is 400° C. or lower, preferably 380° C. or lower, and more preferably 360° C. or lower.

<<Temperature Rising Rate to Temperature Region T3: 6.0 to 14.0° C./s>>

When the temperature rising rate to the temperature region T3 is too low, the iron-based carbides in tempered martensite and bainite become coarse, the average equivalent circular radius of the iron-based carbides becomes too large, and initial cracks are likely to occur at the sheared end face, so that the hole expandability of the steel sheet is deteriorated.

Therefore, the temperature rising rate to the temperature region T3 is 6.0° C./s or more, preferably 6.5° C./s or more, and more preferably 7.0° C./s or more.

On the other hand, when the temperature rising rate to the temperature region T3 is too high, the growth of the iron-based carbide due to tempering does not occur, the proportion p becomes too small, and the delayed fracture resistance characteristics are deteriorated.

Therefore, the temperature rising rate to the temperature region T3 is 14.0° C./s or less, preferably 13.0° C./s or less, and more preferably 12.0° C./s or less.

<<Retention Time in Temperature Region T3: 30 Seconds or More>>

When the retention time in the temperature region T3 is too short, the area fraction of fresh martensite becomes too large in the finally obtained microstructure.

Therefore, the retention time in the temperature region T3 is 30 seconds or more, preferably 100 seconds or more, and more preferably 180 seconds or more.

The upper limit of the retention time in the temperature region T3 is not particularly limited, but is, for example, 800 seconds, preferably 500 seconds, and more preferably 300 seconds.

<Plating Treatment>

The cold-rolled steel sheet subjected to the heat treatment described above may be subjected to a plating treatment for forming a plating layer. Examples of the plating treatment include a hot-dip galvanizing treatment. In this case, a zinc plating layer is formed as the plating layer.

When the hot-dip galvanizing treatment is performed, for example, the cold-rolled steel sheet subjected to the heat treatment described above is immersed in a hot-dip galvanizing bath at 440 to 500° C. After the immersion, the coating weight of the plating layer is adjusted by gas wiping or the like.

In the hot-dip galvanizing bath, elements such as Al, Mg, and Si may be mixed, and further elements such as Pb, Sb, Fe, Mg, Mn, Ni, Ca, Ti, V, Cr, Co, and Sn may be mixed. The amount of Al in the hot-dip galvanizing bath is preferably 0.08 to 0.30%.

The plating treatment may include an alloying treatment for alloying the formed plating layer.

When the alloying treatment is performed after the hot-dip galvanizing treatment, the zinc plating layer is alloyed at a temperature (alloying temperature) of 450 to 600° C. When the alloying temperature is too high, untransformed austenite transforms into pearlite, and the area fraction of retained austenite becomes too small.

The concentration of Fe in the alloyed zinc plating layer is preferably 8 to 17 mass %.

In the case of performing the plating treatment, the cold-rolled steel sheet subjected to the heat treatment and the plating treatment corresponds to the high-strength steel sheet according to aspects of the present invention.

On the other hand, in the case of not performing the plating treatment, the cold-rolled steel sheet subjected to the heat treatment corresponds to the high-strength steel sheet according to aspects of the present invention.

EXAMPLES

Hereinafter, aspects of the present invention will be specifically described with reference to Examples. However, the present invention is not limited to Examples described below.

<Production of Steel Sheet>

Molten steel having the component composition shown in Table 1 below and the balance consisting of Fe and inevitable impurities was produced by a converter furnace and a steel slab was obtained by a continuous casting method.

The obtained steel slab was subjected to hot rolling, coiling, cold rolling, and the heat treatment under the conditions shown in Table 2 below to obtain a cold-rolled steel sheet (CR) having a sheet thickness of 1.4 mm. The reduction ratio of the cold rolling was set to 50%.

Some cold-rolled steel sheets were subjected to a hot-dip galvanizing treatment to form zinc plating layers on both surfaces, thereby obtaining hot-dip galvanized steel sheets (GI). The coating weight (coating weight per one surface) of the zinc plating layer was set to 45 g/m$^2$.

Some hot-dip galvanized steel sheets (GI) were subjected to an alloying treatment to alloy the formed zinc plating layer, thereby obtaining a galvannealed steel sheet (GA). In the alloying treatment, the concentration of Fe in the alloyed zinc plating layer was adjusted to fall within a range of 9 to 12 mass %.

For the hot-dip galvanized steel sheet (GI), a hot-dip galvanizing bath having an amount of Al of 0.19 mass % was used. For the galvannealed steel sheet (GA), a hot-dip galvanizing bath having an amount of Al of 0.14 mass % was used. The bath temperature was set to 465° C. in both cases.

Hereinafter, for convenience, all of the cold-rolled steel sheet (CR), the hot-dip galvanized steel sheet (GI), and the galvannealed steel sheet (GA) are simply referred to as "steel sheet".

In the column of "Type" in Table 2 below, any one of "CR", "GI", and "GA" was described according to the obtained steel sheet.

<Observation of Microstructure>

The obtained steel sheet was polished such that a cross section (L cross section) at a position of ¼ of the sheet thickness parallel to the rolling direction (a position corresponding to ¼ of the sheet thickness in the depth direction from the surface of the steel sheet) was an observation surface, and an observation sample was prepared.

Using the prepared observation sample, the microstructure was observed as follows, and the area fraction of each structure and the like were determined. The results are shown in Table 3 below.

In Table 3 below, tempered martensite is denoted as "TM", bainite is denoted as "B", and fresh martensite is denoted as "FM".

<<Area Fraction of Tempered Martensite, Bainite, and Fresh Martensite>>

The observation surface of the observation sample was corroded using nital, and then an SEM image was obtained by observing 10 fields of view at a magnification of 2000 times using a scanning electron microscope (SEM).

For the obtained SEM image, the area fraction (unit: %) of each structure was determined. The average area fraction of the 10 fields of view was taken as the area fraction of each structure.

In the SEM image, the light gray region was determined as fresh martensite, and the dark gray region where a carbide was precipitated was determined as tempered martensite and bainite.

Since fresh martensite and retained austenite cannot be clearly distinguished in the SEM image, the area fraction of fresh martensite was set to a value obtained by subtracting the area fraction of retained austenite obtained by the method described below from the area fraction of the light gray region.

<<Average Equivalent Circular Radius and Average Aspect Ratio of Iron-Based Carbides>>

The observation surface of the observation sample was corroded using nital, and then an SEM image was obtained by observing 10 fields of view at a magnification of 5000 times using a scanning electron microscope (SEM).

For the obtained SEM image, a major axis a and a minor axis b of each iron-based carbide existing in tempered martensite and bainite were measured.

The equivalent circular radius (unit: μm) of each iron-based carbide was determined from the formula of $\sqrt{(a \times b)/2}$. The aspect ratio (a/b) of each iron-based carbide was determined.

Average values of the equivalent circular radius and the aspect ratio for 10 fields of view were taken as the average equivalent circular radius and the average aspect ratio of the iron-based carbides, respectively.

<<Proportion p>>

The observation surface of the observation sample was corroded using nital, and then an SEM image was obtained by observing 3 fields of view at a magnification of 5000 times using a scanning electron microscope (SEM).

For the obtained SEM image, the area SA1 occupied by the grains of tempered martensite and bainite was measured.

Next, the area SA2 occupied by grains (tempered martensite and bainite) including iron-based carbides, which have major axes facing the same direction within a range of 0 to 10°, at a number density of 7 to 35/μm² was measured.

In addition, the proportion p (unit: %) of the area SA2 with respect to the area SA1 was calculated.

At this time, among the iron-based carbides existing in the grains, iron-based carbides in which the axial direction of the major axis was within 10° in the clockwise or counterclockwise direction were determined to be "iron-based carbides, which have major axes facing the same direction within a range of 0 to 10°".

<Measurement of Diffusible Hydrogen Amount in Steel>

A test piece having a size of 5 mm×30 mm was cut out from the obtained steel sheet. When a plating layer (zinc plating layer or alloyed zinc plating layer) was formed, the plating layer was removed using a router (precision grinder).

The test piece was placed in a quartz tube, and the inside of the quartz tube was replaced with argon gas (Ar). Thereafter, the temperature in the quartz tube was raised to 400° C. at a rate of 200° C./hr, and the amount of hydrogen generated from the inside of the quartz tube during the temperature rise was measured by a temperature rising analysis method using a gas chromatograph.

The cumulative value of the amount of hydrogen detected in a temperature region of room temperature (25° C.) or higher and lower than 250° C. was determined as the diffusible hydrogen amount in steel (unit: mass %). The results are shown in Table 3 below.

18

<Evaluation>

The obtained steel sheet was evaluated by the following test. The results are shown in Table 3 below.

<<Tensile Test>>

From the obtained steel sheet, a JIS No. 5 test piece in which a direction perpendicular to the rolling direction was a tensile direction was collected. Using the collected test piece, a tensile test was performed in accordance with JIS Z 2241 (2011) to measure the tensile strength (TS).

When TS was 1320 MPa or more, it was evaluated as high strength.

<<Hole Expansion Test>>

The obtained steel sheet was subjected to a hole expansion test in accordance with JIS Z 2256 (2010).

Specifically, the obtained steel sheet was cut to collect a test piece having a size of 100 mm×100 mm. A hole having a diameter of 10 mm was punched into the collected test piece with a clearance of 12±1%. Thereafter, using a die having an inner diameter of 75 mm, a conical punch having an apex angle of 60° was pushed into the hole in a state of being pressed at a wrinkle pressing force of 9 ton, and a hole diameter $D_f$ (unit: mm) at a crack generation limit was measured. With the initial hole diameter as $D_0$ (unit: mm), the hole expansion ratio λ (unit: %) was determined from the following formula. When λ was 35% or more, it was evaluated that the hole expandability was excellent.

$$\lambda = \{(D_f - D_0)/D_0\} \times 100$$

<<Evaluation Test of Delayed Fracture Resistance Characteristics>>

A test piece was collected from the obtained steel sheet. When a plating layer was formed, the plating layer was dissolved and removed using diluted hydrochloric acid, stored (dehydrogenated) at room temperature for 1 day, and then a test piece was collected.

As for the size of the test piece, the length of the long side (the length in a direction perpendicular to the rolling direction) was set to 100 mm, and the length of the short side (the length in the rolling direction) was set to 30 mm.

In the test piece, the end face on the long side was defined as an evaluation end face, and the end face on the short side was defined as a non-evaluation end face.

Cutting of the evaluation end face was performed by shearing. The clearance for shearing was 10%, and the rake angle was 0.5 degrees. The evaluation end face was in a state of being subjected to shearing. That is, machining for removing burrs was not performed. On the other hand, machining for removing burrs was performed on the non-evaluation end face.

Such a test piece was subjected to bending. The bending was performed under the condition that a ratio (R/t) of a bending radius R and a sheet thickness t of the test piece was 4.0, and a bending angle was 90 degrees (V-shaped bending).

For example, when the sheet thickness t was 2.0 mm, a punch having a tip radius of 8.0 mm was used. More specifically, a punch having the above-described tip radius and having a U-shape (the tip portion has a semicircular shape, and the thickness of the body portion is 2R) was used.

A die having a corner bending radius of 30 mm was used for the bending.

In the bending, a bent portion having a bending angle of 90 degrees was formed on the test piece by adjusting a depth at which the punch pushes the test piece.

The test piece on which the bent portion was formed was sandwiched and clamped using a hydraulic jack, and bolted in a state where the following residual stress S1, S2, or S3 was loaded on the outermost layer of the bent portion.

Residual stress S1: residual stress of 1300 MPa or more and 1500 MPa or less

Residual stress S2: residual stress of more than 1500 MPa and 1700 MPa or less

Residual stress S3: residual stress of more than 1700 MPa and 1900 MPa or less

The number of test pieces was two for each of the loaded residual stresses S1, S2, and S3.

The necessary clamping degree was calculated by CAE (Computer Aided Engineering) analysis.

Bolting was performed in advance by passing a bolt through an elliptical (minor axis: 10 mm, major axis: 15 mm) hole provided 10 mm inside from the non-evaluation end face of the test piece.

The test piece after bolting was immersed in hydrochloric acid (aqueous hydrogen chloride solution) having a pH of 4, and the pH was controlled to be constant under the condition of 25° C. The amount of hydrochloric acid was 1 L or more per test piece.

After a lapse of 48 hours from the immersion, the presence or absence of visible (having a length of about 1 mm)

microcracks was confirmed for the test piece in hydrochloric acid. This microcrack indicates the initial state of the delayed fracture.

The results depending on the presence or absence of microcracks ("Poor", "Fair", "Good", or "Excellent" shown below) are described in Table 3 below.

Poor: One or more microcracks were observed in the test piece loaded with the residual stress S1.

Fair: No microcracks were observed in the test piece loaded with the residual stress S1, but one or more microcracks were observed in the test piece loaded with the residual stress S2.

Good: No microcracks were observed in the test piece loaded with the residual stress S1 and the residual stress S2, but one or more microcracks were observed in the test piece loaded with the residual stress S3.

Excellent: No microcracks were observed in any of the test pieces.

"Fair", "Good", or "Excellent" was evaluated to be excellent in delayed fracture resistance characteristics.

For the reason that the delayed fracture resistance characteristics are more excellent, "Good" or "Excellent" is preferable, and for the reason that the delayed fracture resistance characteristics are further excellent, "Excellent" is more preferable.

Underlined in Tables 1 to 3 below means outside the scope of the present invention.

TABLE 1

| Steel | Component composition [mass %] | | | | | | | |
|---|---|---|---|---|---|---|---|---|
| symbol | C | Si | Mn | P | S | A | N | Others |
| A | 0.269 | 0.33 | 3.08 | 0.006 | 0.0017 | 0.030 | 0.0046 | |
| B | 0.286 | 0.61 | 2.99 | 0.005 | 0.0009 | 0.032 | 0.0037 | Ni: 0.100, Cr: 0.200 |
| C | 0.116 | 0.90 | 3.01 | 0.005 | 0.0005 | 0.025 | 0.0048 | B: 0.0020 |
| D | 0.259 | 0.88 | 2.96 | 0.005 | 0.0011 | 0.026 | 0.0055 | B: 0.0020, Cu: 0.140 |
| E | 0.262 | 0.99 | 1.93 | 0.006 | 0.0011 | 0.029 | 0.0033 | Ti: 0.020, Nb: 0.019 |
| F | 0.227 | 1.17 | 2.85 | 0.006 | 0.0009 | 0.028 | 0.0027 | Ti: 0.020, Nb: 0.020, B: 0.0020, Cu: 0.130, Sb: 0.008 |
| G | 0.232 | 1.21 | 2.80 | 0.005 | 0.0005 | 0.029 | 0.0035 | Co: 0.100, Ca: 0.0050, Mg: 0.0050 |
| H | 0.258 | 1.18 | 3.07 | 0.007 | 0.0015 | 0.029 | 0.0039 | |
| I | 0.278 | 1.23 | 2.69 | 0.006 | 0.0013 | 0.028 | 0.0028 | V: 0.200, Sn: 0.010, REM: 0.0030 |
| J | 0.283 | 0.88 | 2.71 | 0.005 | 0.0012 | 0.038 | 0.0023 | Mo: 0.100 |
| K | 0.177 | 2.51 | 3.10 | 0.004 | 0.0022 | 0.033 | 0.0028 | Co: 0.100, Hf: 0.008 |
| L | 0.261 | 1.55 | 3.06 | 0.006 | 0.0006 | 0.031 | 0.0031 | Mo: 0.200 |
| M | 0.231 | 1.57 | 3.12 | 0.006 | 0.0001 | 0.031 | 0.0030 | Cr: 0.200, Zr: 0.050, W: 0.100 |
| N | 0.254 | 2.03 | 1.98 | 0.005 | 0.0011 | 0.028 | 0.0038 | Sb: 0.008 |
| O | 0.171 | 1.48 | 3.94 | 0.007 | 0.0003 | 0.030 | 0.0040 | Ta: 0.100, Zr: 0.050, Mo: 0.100 |
| P | 0.218 | 1.21 | 3.08 | 0.005 | 0.0012 | 0.032 | 0.0046 | B: 0.0070, Cu: 0.130, Sb: 0.008 |

TABLE 2

| Sample No. | Steel symbol | Heating temperature [°C] | Finish rolling finishing temperature [°C] | Coiling temperature [°C] | Temperature region T1 [°C] | Retention time in T1 [s] | Average cooling rate R1 [°C/s] | Primary cooling finishing temperature T [°C] | Average cooling rate R2 [°C/s] | Cooling stop temperature T2 [°C] | (R2/R1) in Formula 1 | Left side of Formula 2 | Temperature region T3 [°C] | Temperature rising rate to T3 [°C/s] | Retention time in T3 [s] | Plating treatment Type |
|---|---|---|---|---|---|---|---|---|---|---|---|---|---|---|---|---|
| 1 | A | 1280 | 900 | 650 | 860 | 120 | 25.9 | 330 | 4.7 | 200 | 0.18 | 12305 | 320 | 10.1 | 230 | CR |
| 2 | B | 1260 | 900 | 650 | 870 | 120 | 27.2 | 330 | 4.3 | 200 | 0.16 | 12330 | 280 | 8.2 | 230 | CR |
| 3 | C | 1290 | 900 | 650 | 870 | 120 | 25.0 | 330 | 4.8 | 200 | 0.19 | 12300 | 320 | 10.0 | 230 | CR |
| 4 | D | 1250 | 880 | 650 | 860 | 120 | 27.9 | 340 | 7.6 | 200 | 0.27 | 12382 | 350 | 11.6 | 230 | CR |
| 5 | D | 1210 | 880 | 650 | 870 | 120 | 25.4 | 340 | 7.8 | 310 | 0.31 | 11963 | 350 | 1.8 | 230 | CR |
| 6 | D | 1280 | 870 | 650 | 860 | 120 | 25.7 | 340 | 7.5 | 200 | 0.29 | 12385 | 450 | 15.3 | 230 | CR |
| 7 | D | 1290 | 880 | 500 | 870 | 120 | 26.2 | 330 | 4.2 | 200 | 0.16 | 12236 | 320 | 10.0 | 230 | CR |
| 8 | D | 1220 | 880 | 400 | 870 | 120 | 25.2 | 330 | 4.2 | 200 | 0.17 | 12236 | 320 | 10.0 | 230 | GA |
| 9 | D | 1270 | 870 | 500 | 880 | 120 | 27.8 | 330 | 4.7 | 170 | 0.17 | 12305 | 280 | 10.5 | 230 | GA |
| 10 | D | 1180 | 880 | 500 | 870 | 20 | 26.0 | 320 | 4.0 | 170 | 0.15 | 12140 | 280 | 10.6 | 20 | CR |
| 11 | D | 1250 | 980 | 500 | 880 | 120 | 25.5 | 350 | 4.5 | 200 | 0.18 | 12734 | 380 | 11.6 | 230 | CR |
| 12 | E | 1250 | 900 | 650 | 870 | 120 | 26.3 | 330 | 4.6 | 200 | 0.17 | 12311 | 320 | 10.1 | 230 | CR |
| 13 | F | 1230 | 900 | 500 | 860 | 120 | 26.5 | 340 | 4.2 | 200 | 0.16 | 12544 | 320 | 10.0 | 230 | CR |
| 14 | F | 1220 | 900 | 500 | 860 | 120 | 26.1 | 340 | 7.4 | 200 | 0.28 | 12389 | 320 | 10.0 | 230 | CR |
| 15 | F | 1260 | 900 | 500 | 860 | 120 | 25.3 | 320 | 14.1 | 200 | 0.56 | 11809 | 320 | 7.3 | 230 | CR |
| 16 | F | 1200 | 900 | 500 | 860 | 120 | 26.4 | 410 | 4.4 | 200 | 0.17 | 13990 | 320 | 10.1 | 230 | CR |
| 17 | F | 1210 | 900 | 500 | 860 | 120 | 26.2 | 410 | 8.1 | 200 | 0.31 | 13803 | 320 | 9.9 | 230 | CR |
| 18 | F | 1240 | 900 | 500 | 860 | 120 | 26.3 | 400 | 14.3 | 200 | 0.54 | 13429 | 320 | 10.1 | 230 | CR |
| 19 | F | 1230 | 900 | 500 | 860 | 120 | 25.8 | 400 | 20.1 | 200 | 0.78 | 13328 | 320 | 10.1 | 230 | CR |
| 20 | F | 1240 | 900 | 650 | 860 | 120 | 25.5 | 320 | 4.2 | 150 | 0.16 | 12127 | 200 | 9.7 | 230 | CR |
| 21 | F | 1250 | 900 | 650 | 750 | 120 | 25.1 | 320 | 4.8 | 150 | 0.19 | 2092 | 300 | 13.1 | 230 | CR |
| 22 | F | 1240 | 900 | 500 | 890 | 120 | 24.6 | 330 | 4.7 | 200 | 0.19 | 12305 | 350 | 11.7 | 230 | CR |
| 23 | F | 1240 | 900 | 500 | 890 | 120 | 26.1 | 400 | 8.3 | 200 | 0.32 | 13590 | 350 | 11.6 | 230 | CR |
| 24 | F | 1240 | 900 | 650 | 880 | 120 | 25.3 | 320 | 4.4 | 170 | 0.17 | 12115 | 280 | 10.6 | 230 | CR |
| 25 | F | 1230 | 870 | 700 | 960 | 120 | 25.0 | 330 | 4.3 | 230 | 0.17 | 12330 | 350 | 9.1 | 230 | CR |
| 26 | F | 1260 | 800 | 500 | 830 | 120 | 25.4 | 330 | 4.5 | 200 | 0.18 | 12317 | 320 | 10.2 | 230 | CR |
| 27 | F | 1210 | 890 | 650 | 890 | 120 | 26.8 | 330 | 4.1 | 200 | 0.15 | 12342 | 300 | 8.2 | 230 | CR |
| 28 | G | 1280 | 890 | 650 | 870 | 120 | 25.7 | 330 | 4.0 | 200 | 0.16 | 12349 | 320 | 10.1 | 230 | GA |
| 29 | G | 1270 | 880 | 800 | 870 | 120 | 27.3 | 340 | 4.1 | 230 | 0.15 | 12551 | 320 | 7.3 | 230 | GA |
| 30 | G | 1050 | 880 | 650 | 870 | 120 | 27.3 | 340 | 4.1 | 230 | 0.15 | 12551 | 320 | 7.6 | 230 | GA |
| 31 | H | 1260 | 880 | 500 | 890 | 120 | 25.6 | 330 | 3.6 | 230 | 0.14 | 12378 | 320 | 7.5 | 230 | CR |
| 32 | I | 1200 | 900 | 650 | 870 | 120 | 27.2 | 330 | 4.7 | 200 | 0.17 | 12305 | 320 | 10.1 | 230 | GI |
| 33 | J | 1280 | 900 | 650 | 870 | 120 | 25.2 | 340 | 4.2 | 200 | 0.17 | 12544 | 300 | 8.2 | 230 | CR |
| 34 | K | 1260 | 900 | 500 | 870 | 120 | 26.3 | 330 | 4.9 | 200 | 0.19 | 12294 | 300 | 8.2 | 230 | CR |
| 35 | L | 1230 | 900 | 500 | 870 | 120 | 27.0 | 330 | 4.2 | 200 | 0.16 | 12336 | 320 | 10.1 | 230 | CR |
| 36 | M | 1310 | 900 | 500 | 870 | 120 | 26.7 | 340 | 4.3 | 200 | 0.16 | 12538 | 300 | 8.2 | 230 | CR |
| 37 | N | 1270 | 900 | 500 | 870 | 120 | 27.5 | 330 | 4.9 | 200 | 0.18 | 12294 | 320 | 10.1 | 230 | CR |
| 38 | O | 1250 | 900 | 500 | 870 | 120 | 25.0 | 330 | 4.7 | 200 | 0.19 | 12305 | 300 | 8.2 | 230 | CR |
| 39 | P | 1290 | 870 | 650 | 870 | 120 | 25.2 | 410 | 7.6 | 200 | 0.30 | 13822 | 350 | 11.6 | 230 | CR |

TABLE 3

| Sample No. | Steel symbol | TM + B [%] | FM [%] | Iron-based carbide Average equivalent circular radius [μm] | Average aspect ratio | Proportion p | TS [MPa] | λ [%] | Diffusible hydrogen amount in steel [ppm by mass] | Delayed fracture resistance characteristics | Remarks |
|---|---|---|---|---|---|---|---|---|---|---|---|
| 1 | A | 90.1 | 9 | 0.06 | 1.7 | 12% | 1381 | 19 | 0.05 | Poor | Comparative Example |
| 2 | B | 83.4 | 12 | 0.04 | 2.8 | 40% | 1518 | 36 | 0.04 | Excellent | Inventive Example |
| 3 | C | 94.4 | 2 | 0.03 | 2.4 | 28% | 1183 | 39 | 0.10 | Fair | Comparative Example |
| 4 | D | 77.7 | 13 | 0.05 | 3.6 | 48% | 1420 | 37 | 0.03 | Excellent | Inventive Example |
| 5 | D | 77.8 | 16 | 0.12 | 5.2 | 15% | 1381 | 17 | 0.05 | Poor | Comparative Example |
| 6 | D | 76.9 | 10 | 0.11 | 4.3 | 24% | 1324 | 33 | 0.08 | Poor | Comparative Example |
| 7 | D | 78.5 | 13 | 0.05 | 3.4 | 31% | 1523 | 40 | 0.07 | Good | Inventive Example |
| 8 | D | 77.9 | 14 | 0.03 | 4.3 | 27% | 1498 | 45 | 0.04 | Fair | Inventive Example |
| 9 | D | 69.7 | 13 | 0.04 | 4.4 | 26% | 1301 | 29 | 0.20 | Fair | Comparative Example |
| 10 | D | 76.3 | 18 | 0.05 | 4.6 | 20% | 1482 | 20 | 0.04 | Poor | Comparative Example |
| 11 | D | 81.1 | 9 | 0.06 | 4.3 | 23% | 1343 | 37 | 0.19 | Poor | Comparative Example |
| 12 | E | 90.1 | 5 | 0.04 | 4.4 | 27% | 1414 | 31 | 0.05 | Fair | Comparative Example |
| 13 | F | 81.3 | 11 | 0.05 | 2.2 | 29% | 1480 | 44 | 0.27 | Good | Inventive Example |
| 14 | F | 81.5 | 9 | 0.05 | 3.5 | 30% | 1480 | 41 | 0.03 | Good | Inventive Example |
| 15 | F | 81.0 | 10 | 0.04 | 4.8 | 24% | 1471 | 34 | 0.04 | Poor | Comparative Example |
| 16 | F | 80.2 | 10 | 0.05 | 3.8 | 26% | 1474 | 51 | 0.10 | Fair | Inventive Example |
| 17 | F | 80.9 | 10 | 0.04 | 4.0 | 33% | 1472 | 46 | 0.08 | Good | Inventive Example |
| 18 | F | 81.1 | 11 | 0.04 | 4.4 | 35% | 1467 | 39 | 0.24 | Good | Inventive Example |
| 19 | F | 80.9 | 11 | 0.04 | 4.4 | 22% | 1465 | 36 | 0.04 | Poor | Comparative Example |
| 20 | F | 89.4 | 7 | 0.04 | 4.2 | 20% | 1654 | 37 | 0.15 | Poor | Comparative Example |
| 21 | F | 48.7 | 16 | — | — | 0% | 1217 | 5 | 0.06 | Poor | Comparative Example |
| 22 | F | 79.1 | 11 | 0.04 | 3.5 | 33% | 1430 | 44 | 0.05 | Good | Inventive Example |
| 23 | F | 79.4 | 12 | 0.04 | 4.3 | 39% | 1410 | 52 | 0.10 | Excellent | Inventive Example |
| 24 | F | 81.7 | 10 | 0.05 | 5.1 | 23% | 1576 | 27 | 0.08 | Poor | Comparative Example |
| 25 | F | 80.4 | 11 | 0.05 | 4.5 | 24% | 1442 | 40 | 0.06 | Poor | Comparative Example |
| 26 | F | 66.7 | 11 | 0.04 | 4.3 | 34% | 1286 | 28 | 0.10 | Good | Comparative Example |
| 27 | F | 77.4 | 13 | 0.04 | 3.5 | 45% | 1488 | 41 | 0.05 | Excellent | Inventive Example |
| 28 | G | 80.6 | 10 | 0.04 | 3.6 | 31% | 1474 | 45 | 0.08 | Good | Inventive Example |
| 29 | G | 69.3 | 11 | 0.05 | 4.3 | 26% | 1316 | 27 | 0.10 | Fair | Comparative Example |
| 30 | G | 80.6 | 10 | 0.05 | 3.5 | 23% | 1452 | 35 | 0.07 | Poor | Comparative Example |
| 31 | H | 78.8 | 12 | 0.04 | 4.3 | 45% | 1440 | 42 | 0.05 | Excellent | Inventive Example |
| 32 | I | 79.9 | 11 | 0.05 | 4.4 | 27% | 1483 | 40 | 0.17 | Fair | Inventive Example |
| 33 | J | 83.6 | 10 | 0.06 | 4.3 | 50% | 1499 | 43 | 0.04 | Excellent | Inventive Example |
| 34 | K | 83.0 | 8 | 0.03 | 3.2 | 26% | 1472 | 27 | 0.26 | Fail | Comparative Example |
| 35 | L | 77.0 | 12 | 0.04 | 3.7 | 28% | 1456 | 37 | 0.04 | Fair | Inventive Example |
| 36 | M | 75.8 | 12 | 0.04 | 3.6 | 26% | 1515 | 36 | 0.08 | Fair | Inventive Example |
| 37 | N | 85.3 | 5 | 0.03 | 2.7 | 29% | 1377 | 37 | 0.04 | Good | Inventive Example |
| 38 | O | 81.7 | 8 | 0.05 | 3.9 | 26% | 1368 | 36 | 0.06 | Fair | Inventive Example |
| 39 | P | 78.1 | 13 | 0.05 | 4.1 | 33% | 1395 | 38 | 0.09 | Good | Inventive Example |

<Summary of Evaluation Results>

As shown in Table 3 above, in the steel sheets of Nos. 1, 3, 5 to 6, 9 to 12, 15, 19 to 21, 24 to 26, 29 to 30, and 34, at least any one of the tensile strength, the hole expandability, and the delayed fracture resistance characteristics was insufficient.

On the other hand, it was found that all of the steel sheets of Nos. 2, 4, 7 to 8, 13 to 14, 16 to 18, 22 to 23, 27 to 28, 31 to 33, and 35 to 39 have a tensile strength of 1320 MPa or more, and are excellent in hole expandability and delayed fracture resistance characteristics.

The evaluation results of the delayed fracture resistance characteristics of these steel sheets showed that a steel sheet having a proportion p of 26% or more (less than 28%) was "Fair", a steel sheet having a proportion p of 29% or more (less than 38%) was "Good", and a steel sheet having a proportion p of 39% or more was "Excellent".

The invention claimed is:

1. A high-strength steel sheet comprising:
a component composition including, by mass %:
C: 0.130 to 0.350%,
Si: 0.50 to 2.50%,
Mn: 2.00 to 4.00%,
P: 0.100% or less,
S: 0.0500% or less,
Al: 0.001 to 2.000%,
N: 0.0100% or less, and
a balance being Fe and inevitable impurities; and a microstructure, wherein
a diffusible hydrogen in steel is 0.50 ppm by mass or less,
a total area fraction of tempered martensite and bainite in the microstructure is 70.0% or more,
an area fraction of fresh martensite is 15.0% or less,
iron-based carbides existing in the tempered martensite and the bainite have an average equivalent circular radius of 0.10 μm or less and an average aspect ratio of 4.5 or less, and
a proportion p of tempered martensite and bainite including iron-based carbides, which have major axes facing the same direction within a range of 0 to 10°, at a number density of 7 to 35/μm² among the tempered martensite and the bainite is 25 to 70%.

2. The high-strength steel sheet according to claim 1, wherein
the component composition further includes, by mass %, at least one element selected from the group consisting of:
Ti: more than 0% and not more than 0.100%, Nb: more than 0% and not more than 0.100%,
V: more than 0% and not more than 0.500%,
W: more than 0% and not more than 0.500%,
B: more than 0% and not more than 0.0100%,
Ni: more than 0% and not more than 2.000%,
Co: more than 0% and not more than 2.000%,
Cr: more than 0% and not more than 1.000%,
Mo: more than 0% and not more than 1.000%,
Cu: more than 0% and not more than 1.000%,
Sn: more than 0% and not more than 0.500%,
Sb: more than 0% and not more than 0.500%,
Ta: more than 0% and not more than 0.100%,
Zr: more than 0% and not more than 0.200%,
Hf: more than 0% and not more than 0.020%,
Ca: more than 0% and not more than 0.0100%,
Mg: more than 0% and not more than 0.0100%, and
REM: more than 0% and not more than 0.0100%.

3. The high-strength steel sheet according to claim 2, comprising a plating layer on a surface.

4. The high-strength steel sheet according to claim 3, wherein the plating layer is an alloyed plating layer.

5. The high-strength steel sheet according to claim 1, comprising a plating layer on a surface.

6. The high-strength steel sheet according to claim 5, wherein the plating layer is an alloyed plating layer.

7. A method for producing the high-strength steel sheet according to claim 1, the method comprising:

heating a steel slab having the component composition according to claim 1 to 1100° C. or higher and hot rolling the steel slab at a finish rolling finishing temperature of 850 to 950° C. to obtain a hot-rolled steel sheet;

coiling the hot-rolled steel sheet at a coiling temperature of 700° C. or lower and then cold rolling the coiled hot-rolled steel sheet to obtain a cold-rolled steel sheet; and subjecting the cold-rolled steel sheet to a heat treatment, wherein in the heat treatment, the cold-rolled steel sheet is held in a temperature region T1 of 800 to 950° C. for 30 seconds or more, then cooled to a cooling stop temperature T2 of 250° C. or lower, then heated at a temperature rising rate of 6.0 to 14.0° C./s to a temperature region T3 of 250 to 400° C., and then held for 30 seconds or more, and in the cooling, the cold-rolled steel sheet is primarily cooled to a temperature T at an average cooling rate $R_1$ of 10.0 to 50.0° C./s and then secondarily cooled to the cooling stop temperature T2 at an average cooling rate $R_2$ under a condition that the following Formulas 1 and 2 are satisfied, $$0.10 < \left(R_2/R_1\right) < 0.70 \qquad \text{Formula 1}$$

-continued
$$(21.52 \times T + 5630) \times R_2^{-0.022} \geq 12200. \qquad \text{Formula 2}$$

8. The method for producing the high-strength steel sheet according to claim 7, wherein the cold-rolled steel sheet is subjected to a plating treatment for forming a plating layer after the heat treatment.

9. The method for producing the high-strength steel sheet according to claim 8, wherein the plating treatment includes an alloying plating treatment for alloying the plating layer.

10. A method for producing the high-strength steel sheet according to claim 2, the method comprising:

heating a steel slab having the component composition according to claim 2 to 1100° C. or higher and hot rolling the steel slab at a finish rolling finishing temperature of 850 to 950° C. to obtain a hot-rolled steel sheet;

coiling the hot-rolled steel sheet at a coiling temperature of 700° C. or lower and then cold rolling the coiled hot-rolled steel sheet to obtain a cold-rolled steel sheet; and subjecting the cold-rolled steel sheet to a heat treatment, wherein in the heat treatment, the cold-rolled steel sheet is held in a temperature region T1 of 800 to 950° C. for 30 seconds or more, then cooled to a cooling stop temperature T2 of 250° C. or lower, then heated at a temperature rising rate of 6.0 to 14.0° C./s to a temperature region T3 of 250 to 400° C., and then held for 30 seconds or more, and in the cooling, the cold-rolled steel sheet is primarily cooled to a temperature T at an average cooling rate $R_1$ of 10.0 to 50.0° C./s and then secondarily cooled to the cooling stop temperature T2 at an average cooling rate $R_2$ under a condition that the following Formulas 1 and 2 are satisfied, $$0.10 < \left(R_2/R_1\right) < 0.70 \qquad \text{Formula 1}$$

$$(21.52 \times T + 5630) \times R_2^{-0.022} \geq 12200. \qquad \text{Formula 2}$$

11. The method for producing the high-strength steel sheet according to claim 10, wherein the cold-rolled steel sheet is subjected to a plating treatment for forming a plating layer after the heat treatment.

12. The method for producing the high-strength steel sheet according to claim 11, wherein the plating treatment includes an alloying plating treatment for alloying the plating layer.

* * * * *